(12) United States Patent
Kalliola et al.

(10) Patent No.: US 7,733,799 B2
(45) Date of Patent: Jun. 8, 2010

(54) INFORMATION GATHERING FROM TRAFFIC FLOW IN A COMMUNICATION NETWORK

(75) Inventors: Janne Kalliola, Espoo (FI); Juha Koponen, Helsinki (FI); Thomas Dahlblom, Espoo (FI); Markus Aalto, Vantaa (FI); Tommi Lattu, Madrid (ES); Mikko Tiihonen, Helsinki (FI); MengHong Wong, Singapore (SG)

(73) Assignee: Airwide Solutions Oy, Espoo (FI)

( * ) Notice: Subject to any disclaimer, the term of this patent is extended or adjusted under 35 U.S.C. 154(b) by 81 days.

(21) Appl. No.: 11/885,693

(22) PCT Filed: Mar. 24, 2006

(86) PCT No.: PCT/FI2006/050113

§ 371 (c)(1),
(2), (4) Date: May 5, 2008

(87) PCT Pub. No.: WO2006/100352

PCT Pub. Date: Sep. 28, 2006

(65) Prior Publication Data

US 2008/0279113 A1    Nov. 13, 2008

(30) Foreign Application Priority Data

Mar. 24, 2005 (FI) .................................. 20055132

(51) Int. Cl.
*H04L 12/26* (2006.01)

(52) U.S. Cl. ...................................... 370/252; 709/224
(58) Field of Classification Search .................. 370/252
See application file for complete search history.

(56) References Cited

U.S. PATENT DOCUMENTS

| | | | | |
|---|---|---|---|---|
| 5,559,864 | A * | 9/1996 | Kennedy, Jr. | 455/412.1 |
| 5,893,077 | A | 4/1999 | Griffin | 705/34 |
| 6,195,543 | B1 * | 2/2001 | Granberg | 455/407 |
| 6,253,195 | B1 * | 6/2001 | Hudis et al. | 707/2 |
| 6,421,358 | B1 * | 7/2002 | Stimmel et al. | 370/489 |
| 6,813,247 | B1 * | 11/2004 | Hassan | 370/252 |
| 2002/0111922 | A1 * | 8/2002 | Young et al. | 705/80 |
| 2003/0074439 | A1 * | 4/2003 | Grabarnik et al. | 709/224 |
| 2004/0153552 | A1 * | 8/2004 | Trossen et al. | 709/229 |
| 2004/0255025 | A1 | 12/2004 | Ricagni | |
| 2005/0014483 | A1 * | 1/2005 | Lagerstrom | 455/405 |
| 2005/0264412 | A1 * | 12/2005 | Levesque et al. | 340/517 |

* cited by examiner

*Primary Examiner*—Ricky Ngo
*Assistant Examiner*—Rasheed Gidado
(74) *Attorney, Agent, or Firm*—Shalom Wertsberger; Saltamar Innovations

(57) ABSTRACT

The invention relates to a method for gathering information from traffic flowing in communication networks. The method includes generating in a network element, which sees the traffic flowing in the network, events on the basis of the traffic flow and predefined instructions, an event being a piece of information indicating that a certain matter has occurred in the traffic flow, sending said events for analysis in a central processing element, analysing said events in said central processing element, and conveying on the basis of said analysis information to network operator systems.

23 Claims, 8 Drawing Sheets

INFORMATION GATHERING FROM TRAFFIC FLOW IN A COMMUNICATION NETWORK

FIELD OF THE INVENTION

The invention relates to gathering of information from traffic flowing in communication networks.

BACKGROUND OF THE INVENTION

The business of mobile network operators is based on controlling and billing their customers (the users of mobile networks).

Traditionally mobile network concepts and technologies have been network operator-centric, that is, the network operator has been responsible for offering the services available in the network. Thereby, controlling access rights and collecting billing information has been easy to arrange for the network operators.

However, the newer concepts and technologies are based on open Internet standards and additional services offered by third parties, who may be completely independent of the network operator, whose network their customers are using. The services are provided to mobile terminals through gateways, which are usually administered by the network operator. Different gateways are used for different types of traffic (SMS, MMS, WAP, HTTP, e-mail, instant messaging, streaming and so forth). The gateways provide connectivity between terminals and service providers systems. That is, the users may be allowed to completely by-pass network operator's applications. Naturally, the mobile network operators are nevertheless trying to maintain their position as a single control point for mobile networks for controlling access rights and collecting billing information. The use of billing functionalities offered by the network operators are reasonable also in view of the external service providers, since that way they do not need to implement sometimes complex billing systems, but can instead concentrate on their core business. In addition, in many countries, the operator is responsible for the traffic that is flowing in their network and thus the operator must know what that traffic is and must have measures to control the traffic flow.

Furthermore, network operators have access to certain valuable data (network capabilities), such as terminal location, terminal capabilities or characteristics of used connection (for example available bandwidth) that can provide added value for services offered by external service providers. Some service providers need to have access to this information in order to offer their services.

Therefore, the network operators still need to control the traffic on the network level, or in other words, to understand the traffic (protocols) in order to be able to handle access control and billing decisions.

FIGS. 1 and 2 show two prior art arrangements for implementing information gathering from network traffic of mobile terminal users in mobile networks and controlling thereof.

In FIG. 1, each gateway has been integrated to network operator systems, which need information about network traffic or which may control network traffic. Such network operator systems are for example billing system, location system and client capability system. The system comprises two gateway elements 101 and 102 in an operator network. The gateway elements may be for example an MMS gateway and a WAP gateway. Service providers 103 and 104 are respectfully connected to the gateway elements 101 and 102 over Internet. By means of the functionality provided by the gateway elements these service providers provide services to mobile subscribers 105 and 106, which are connected to the gateway elements via mobile network. Herein it must be noted that the gateway elements need not be physically separate devices. Alternatively, they may be software processes running on the same server. Further one service provider may be connected to more than one gateway element and equally one mobile subscriber may be connected to more that one gateway element.

The gateway elements 101 and 102 are connected to (integrated to) network capability systems of the network operator, that is, to a prepaid/postpaid system 107 (billing system), a client capability system 108 and a location system 109. This means that the gateway elements have been implemented so that they are able to employ the functionalities offered by the network capability systems.

In this arrangement each gateway operates as a separate entity. The gateways 101 and 102 are implemented so that they understand the traffic that goes through them. They are adapted to take care of accounting and billing by creating billing tickets (Call Detail Record, CDR) on the basis of fixed or modifiable logic. Further they may be adapted to use some (predefined) logic for granting/controlling access to different services or systems, for using client capabilities obtainable from the client capability system 108, or for using location information obtainable from the location system 109.

The problem in this arrangement is that each gateway needs to be adapted to properties of each network capability system that is used, that is, management and integration has to be done separately for each system. Thereby, for example modifying or expanding the system is burdensome. Additionally a separate solution is needed for each traffic type as the gateway needs to understand the traffic, and the solution does not scale well, as different users may have different rules for billing and access control. Also the network capability systems vary from operator to operator, thus adding additional burden in integrating the gateways with various different network capability systems.

In FIG. 2, an external traffic snooping system 205 collects information from network traffic and provides it to network operator systems, which need information about network traffic. The system is otherwise similar to the system of FIG. 1 except that now the gateway elements 101 and 102 are not connected to (or integrated to) network capability systems of the network operator. Instead, the traffic snooping system 205 is connected to (or integrated to) a prepaid/postpaid system 107 and possibly to some other operator systems that need to collect information about the traffic in the network.

The system comprises snooping means 201 and 202, which are located on the signal path between the mobile subscribers 105 and 106 and the gateways 101 and 102, respectively. The snooping means 201 and 202 are connected to the traffic snooping system 205. Alternatively, the system might comprise equivalent snooping means 203 and 204 located on the signal path between the gateways 101 and 102 and the service providers 103 and 104, respectively. The principle is to have an arrangement, wherein each message/connection passes by snooping means. It is also possible that the snooping means are included in the gateway or that the gateway is adapted to route all traffic that goes through it via snooping means.

By means of the snooping means the traffic snooping system 205 sees the traffic flowing in the network and can extract information from the flow. The traffic snooping system is adapted to listen to the traffic in the network and parse billable/controllable features from it. For example, the traffic snooping system 205 is adapted to create billing tickets (CDR) on the basis of some predefined rules and the traffic that is seen by means of the snooping means 201 and 202. However, the traffic snooping system does not fully understand the content of the traffic or network capabilities. Further, the traffic snooping system cannot stop the traffic flow by itself, but only to signal information about the traffic to other systems, which may be capable of stopping the traffic.

The problem in this arrangement is that the traffic snooping system cannot contain a full replica of gateways' internal state machine that handles the traffic flow. (If it would, it would implement the gateway functionality described in FIG. 1.) Thus snooping is always superficial, as the traffic is not fully understood. The snooping system may understand traffic in a fundamentally different way compared to the gateways and all traffic features may not be extractable in a superficial snooping. Furthermore, the system cannot do anything with encrypted traffic. Compressed traffic may generate huge processing loads and memory consumption, as the snooping system has to uncompress it before trying to parse it. And as mentioned above, external systems are needed for stopping the traffic flows.

On the basis of the description above, a new solution is needed for gathering information from traffic flowing in communication networks and for controlling the traffic.

SUMMARY OF THE INVENTION

An object of the present invention is thereby to provide a new solution for gathering information from traffic flowing in communication networks.

One of the principles of the invention is to define declarative integration between gateways and capability systems of network operator (billing, location, client capability, hand-set database, authentication system, reporting system and so on). The gateways (or other elements that see the traffic flowing in the network) declare things that happen in the network to a central processing element (the gateways send "events" to the central processing element). The central processing element then analyses the declarations and on the basis of the analysis co-operates with the capability systems via a procedural integration interface between the central processing element and the capability systems. In this way there is no need to have procedural integration between each and every one of the gateways and the capability systems. Further there is no need to implement for example billing logic into plurality of gateways, but only to the central processing element.

The principle is to divide the information gathering from network traffic into two separate phases:
1) Gateways (or other comparable network elements) have plug-ins that create predefined type of events from the traffic flow and declare them to a centralised system. They understand the protocols that are used in the network, but they do not need to understand what kind of actions may be caused in the network operator's capability systems on the basis of things that happen in the network.
2) The events are handled by a centralised system that has the business intelligence and knows for example which actions are billable. However, the centralised system does not need to understand the protocols that are used in the network.

The difference with regard to prior art solutions is that in prior art the element that communicates with the capability systems is at the same time an element which sees the traffic flow. Now these operations have been divided into two separate elements, whereby it is possible to extract information from the traffic flow near the traffic and implement the integration to the network operator systems near those systems.

A further difference with regard to prior art solutions is that because the events that are generated are now analysed in a centralised system, the business intelligence of the system may reside therein. Thereby for example billing logic may be changed by modifying the logic that implements the business intelligence in the centralised system without a need to make often burdensome modifications in the billing systems.

One of the basic ideas of the invention is to adapt gateway elements or other comparable network elements, via which messages or connections are routed, to generate predefined events on the basis of the traffic flowing through them. At least some of the events are generalised so that they are not specific to any particular network protocol, but instead can be used in connection with plurality of protocols. The events are then sent to a centralised event aggregator element, which is adapted to communicate with network operator systems, such as billing and capabilities systems. The event aggregator analyses the events that are received from the gateway elements and provides relevant information to the network operator systems.

Instead of just providing information the events may also be query type of events. In that case, the gateway element stops processing the message/connection in question until an answer is received from the event aggregator. The answer may be for example some additional information, an order to discard the message/connection or consent to proceed with processing the message/connection.

According to a first aspect of the invention, there is provided a method for gathering information from traffic flowing in communication networks. The method comprises generating in a network element, which sees the traffic flowing in the network, events on the basis of the traffic flow and predefined instructions, an event being a piece of information indicating that a certain matter has occurred in the traffic flow, sending said events for analysis in a central processing element, analysing said events in said central processing element, and conveying on the basis of said analysis information to network operator systems.

According to a second aspect of the invention, there is provided a system for gathering information from traffic flowing in communication networks, the system comprising at least one network element, via which the traffic flow passes, and network operator systems. The system further comprises a central processing element, which is connected to the network element and to the network operator systems. The network element comprises equipment for generating events on the basis of the traffic flow and predefined instructions, an event being a piece of information indicating that a certain matter has occurred in the traffic flow, and equipment for sending said events for analysis in the central processing element, and the central processing element comprises equipment for analysing said events, and equipment for conveying on the basis of said analysis information to the network operator systems.

According to a third aspect of the invention, there is provided a network element, via which traffic flow of a communication network passes. The network element is arranged to co-operate with a central processing element, and comprises equipment for generating events on the basis of the traffic flow and predefined instructions, an event being a piece of information indicating that a certain matter has occurred in the traffic flow, and equipment for sending said events for analysis in the central processing element.

Such network element may be for example a gateway, a router, a firewall, a GGSN (Gateway GPRS Support Node), a Service Delivery Platform or a part of a Service Delivery Platform or some other traffic relaying network element or a traffic snooping system.

According to a fourth aspect of the invention, there is provided a central processing element for gathering information from traffic flowing in communication networks. The central processing element is arranged to co-operate with at least one network element, via which the traffic flow passes and network operator systems, and comprises equipment for receiving events generated in a network element on the basis of the traffic flow and predefined instructions, an event being a piece of information indicating that a certain matter has occurred in the traffic flow, equipment for analysing said events, and equipment for conveying on the basis of said analysis information to the network operator systems.

The invention further relates to such computer program stored on a memory device.

According to a fifth aspect of the invention, there is provided a computer program executable in a network element, via which traffic flow of a communication network passes. The network element is arranged to co-operate with a central processing element, and the computer program controls the network element to generate events on the basis of the traffic flow and predefined instructions, an event being a piece of information indicating that a certain matter has occurred in the traffic flow, and to send said events for analysis in the central processing element.

The invention further relates to such computer program stored on a memory device.

According to a sixth aspect of the invention, there is provided a computer program for a central processing element for gathering information from traffic flowing in communication networks. The central processing element is arranged to co-operate with at least one network element, via which the traffic flow passes and network operator system, and the computer program controls the central processing element to receive events generated in a network element on the basis of the traffic flow and predefined instructions, an event being a piece of information indicating that a certain matter has occurred in the traffic flow, to analyse said events, and to convey on the basis of said analysis information to the network operator systems.

Dependent claims contain some embodiments of the invention. The subject matter contained in dependent claims relating to a particular aspect of the invention is also applicable to other aspects of the invention.

Some of the benefits that various embodiments of the invention provide include the following:

The events are generated near the traffic. Gateways or other network elements that produce events according to the invention understand the traffic, whereby the events can be very specific. Also compressed or encrypted data can be analysed for events, if such data is uncompressed or decrypted in the gateway, which is usually done as a part of normal traffic processing.

It is possible to make the event generation configurable, so that only required event types are generated. Thereby no extra (unnecessary) traffic is generated between gateways and the event aggregator.

In many cases the events are small and so plurality of events can be bundled together and communicated to the central processing element in one bundle.

Same event types can be generated in different types of gateways. Therefore there might not be a need to change the event analysis logic in the central processing element (or event aggregator) even if a new gateway is added to the network.

Billing and other integrations need to be done only between the billing system and the central processing element. The events provide a unified interface towards billing and other capabilities. Thereby it is easier to add new gateways into the network.

Billing and capabilities can be managed from a single place.

The whole network provides one set of statistics. This information can be used, for example, in issue resolving, business analysis, marketing and future investment planning.

BRIEF DESCRIPTION OF THE DRAWINGS

Embodiments of the invention will now be described by way of example with reference to the accompanying drawings in which.

DETAILED DESCRIPTION

Figure 1:
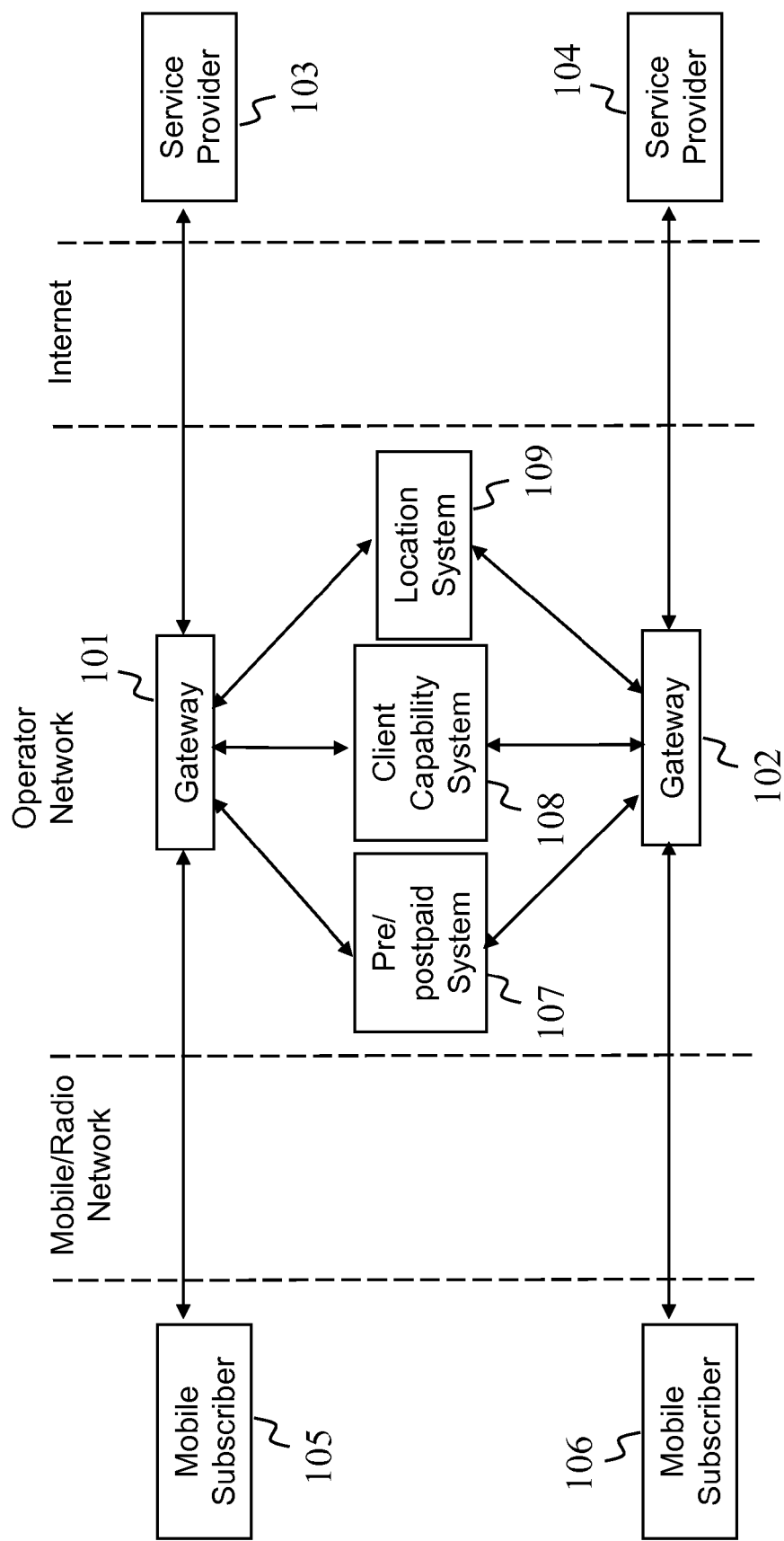
FIGS. 1-2 show prior art arrangements for implementing information gathering from network traffic of mobile terminal users in mobile networks and controlling thereof.
Figure 2:
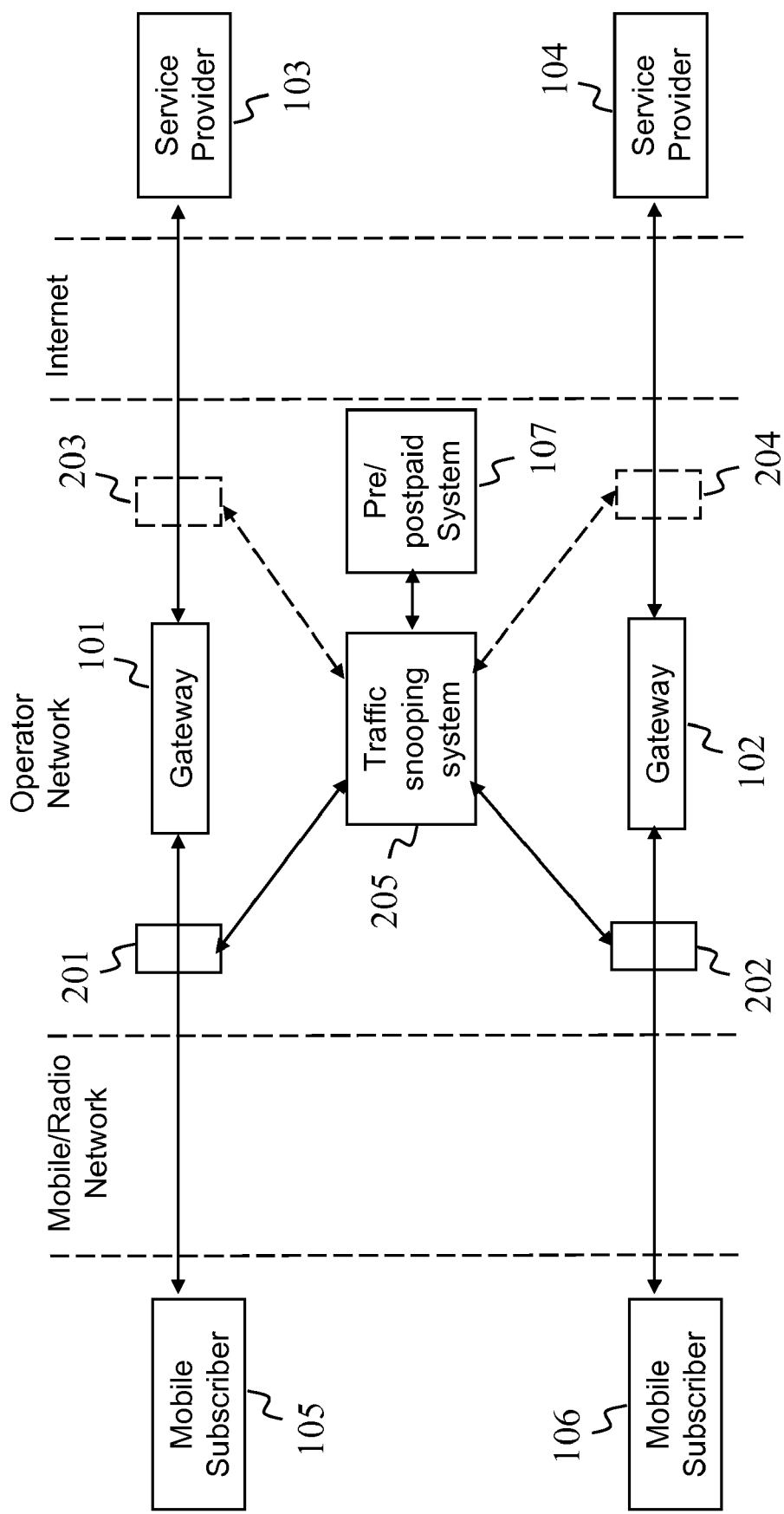

FIGS. 1 and 2 were already discussed above in connection with prior art.

In general, the invention is based on a two-phased (or a two-element) system:
1) the gateways (or other comparable network elements) have plug-ins that create predefined type of events from the traffic flow, and
2) the events are handled by a centralised system that is connected to network operators systems, such as billing and location systems.

The centralised system may contain business logic so that the events are pre-processed for the network operator systems. The business logic in the centralised system is implemented for example by means of scripts or other easily modifiable means so that business logic can be adjusted when needed. There may be a user interface, for example a graphical user interface, which is used to configure parameters in the business logics. Also, there may be a graphical tool for provisioning the business logics.

In an embodiment of the invention the event generation is configurable, and thereby only required event types are sent forward. The same event types are used in connection with all users (this could, of course, be configurable, too). That is, the element that generates the events does not need to know anything about the user. The event aggregator may drop certain events for certain users without further actions (for example if a service is in a content package or user has free credits there is no need to create billing tickets.)

Figure 3:
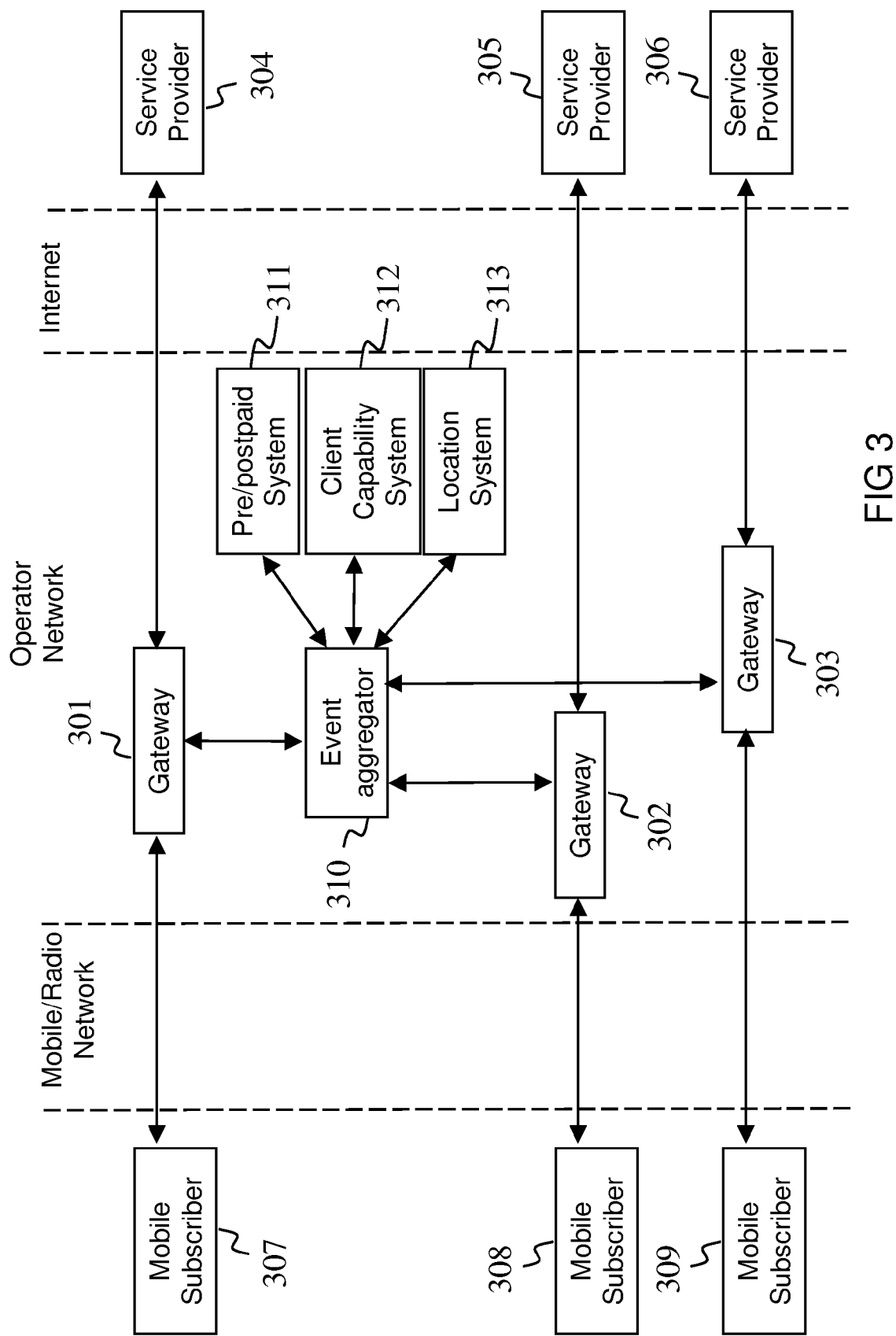
FIG. 3 illustrates a system according to an embodiment of the invention.

FIG. 3 illustrates a system according to an embodiment of the invention.

The system comprises three gateway elements 301-303 in an operator network. The gateway elements may be for example an MMS gateway and a WAP gateway. Service providers 304-306 are respectfully connected to the gateway elements 301-303 over Internet. By means of the functionality provided by the gateway elements these service providers provide services to mobile subscribers 307-309, which are connected to the gateway elements via mobile network. Herein it must be noted that the gateway elements need not be physically separate devices. Alternatively, they may be software processes running on the same server. Further one service provider may be connected to more than one gateway element and equally one mobile subscriber may be connected to more that one gateway element.

The gateway elements 301-303 are connected to (integrated to) an event aggregator element 310. The gateways 301-303 are configured so that when they execute operations relating to message transfer or connections they encounter instructions to generate predefined events and to send them to the event aggregator element.

The event aggregator element 310 is connected to (integrated to) network capability systems of the network operator, that is, to a prepaid/postpaid system 311 (billing system), a client capability system 312 and a location system 313. This means that the event aggregator element has been implemented so that it is able to employ the functionalities offered by the network capability systems. In addition to or instead of the shown elements the network operator system may comprise a hand-set database, an authentication system, a reporting system, an OSA (Open Service Architecture) Parlay system, an OSA Parlay X system, an ss7 connectivity to HLR (Home Location Register) system, a Presence server, a customer profile database, a content transcoding system, and/or a digital rights management system.

The communication between the gateways 301-303 and the event aggregator 310 may be synchronous or asynchronous. Any protocol, such as HTTP, SOAP, RMI, CORBA, Web Services and so forth, may be used in that communication. Furthermore, the events may be encoded in any suitable format, such as XML, plain text, binary messages, and so forth.

Analysis of the events in the event aggregator is based on business logic implemented in the event aggregator. The business logic contains rules according to which the events that are received are analysed. The rules for example state what type of information, if any, is sent to a billing system (or to some other network operator system), when certain event has occurred. By having the business logic implemented in the event aggregator the maintenance and modifications of the whole system may be easier than before. For example by adjusting the business logic script in the event aggregator, billing system changes might be avoided. Such billing system changes are often burdensome. In this case, the business logic script can be such that the information that is forwarded to the billing system does not change, only the circumstances that lead to sending the information are changed.

Figure 4:
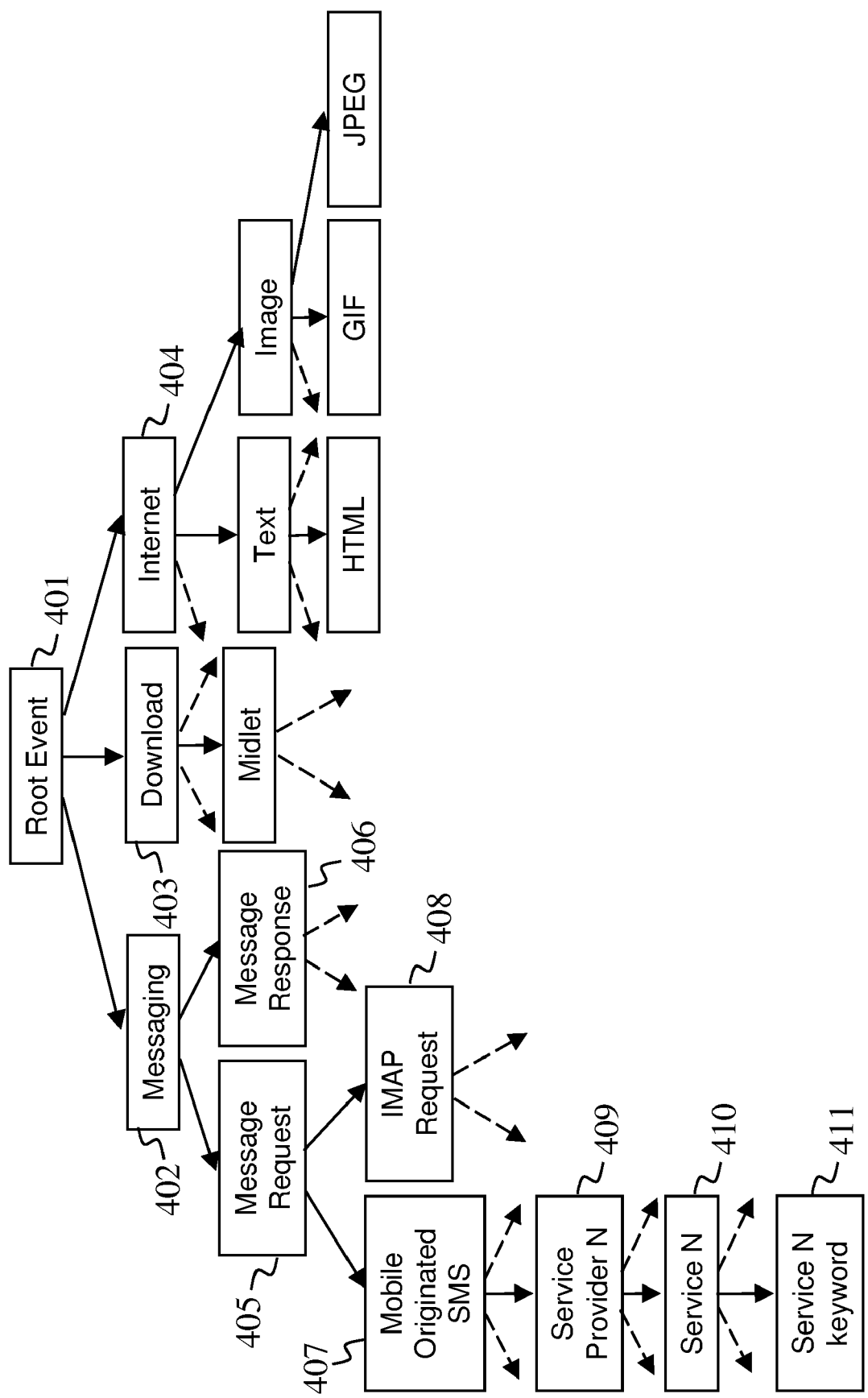
FIG. 4 illustrates an event tree according to an embodiment of the invention.

FIG. 4 illustrates an event tree according to an embodiment of the invention. Such tree is used in the event aggregator for analysing the events. That is, the business logic is defined in the tree. Clearly also other forms of implementing the business logic are possible.

When event analysis is initially configured (or later modified), different events are categorised and placed into a tree. Each node of the tree comprises an event and an action that is to be executed when the corresponding event occurs. The event tree has a root event that is common to all events of the tree. The structure of the tree is based on common functionality/behaviour relating to the event. Child events in the tree inherit features from the parent event(s) and all events have same features as the root event.

In the example of FIG. 4, the root event 401 has three child events corresponding to different data transfer types: messaging 402, download 403 and internet 404. Messaging is divided into child events message request 405 and message response 406. Message request event is again divided into Mobile originated SMS 407 and IMAP request 408. One of the child events of the Mobile originated SMS is Service provider N 409, one of the child events of the Service provider N is Service N 410, and one of the child events of the Service N is Service N keyword 411.

Obviously the event tree structure that is shown is only one example and basically any other structure is possible.

When an event is received at the event aggregator, the event aggregator looks for that event in the event tree (for example on the basis of an identifier set for the event), and if the event is found executes the corresponding action. Depending on the configuration of the system, the actions relating to all higher-level events all the way up to the root event may be executed as well.

It must be noted that the event aggregator may not understand all events in detailed manner. For example, if the event aggregator receives an event with a service N keyword, which is not defined in the event aggregator tree, the event aggregator looks for an applicable action in a higher level of the tree, that is, for example an applicable action for the service N, and proceeds in this way until an applicable action is found. To illustrate this by means of a practical example let's consider an event tree containing definition for an event 'Directory enquiries' and as a child event for that service a keyword event 'Directory enquiries—FIND'. Now, when the event aggregator using this event tree receives an event 'Directory enquiries—FETCH', it does not find any specific action for that keyword event. In that case the event aggregator goes one level upwards in the event tree and executes the action defined for the event 'Directory enquiries'.

Also more than one tree may be used at the same time. Overlapping trees may form a graph, in which the nodes have several parents and the nodes inherit the behaviours of all parent nodes. The multiple inheritance order is prioritised to avoid contradictory behaviour or the correct tree to follow is selected based on predefined criteria, such as the event type, service provider, billing, and so forth.

Further, the same event may belong to more than one tree in the event aggregator. For example, technical and commercial handling of an event may be different. This may be illustrated by an MMS message, which is commercially just an MMS message and the user is usually billed for sending one MMS message. But technically an MMS message is a SMS notification combined with a GPRS download. Therefore there may be three events associated with delivery of an MMS message: 1) MMS message transferred, 2) SMS message transferred and 3) X bytes downloaded over GPRS. Now, event 1 is usually used for creating billing ticket, whereas the events 2 and 3 may be used for example for monitoring load in the network.

The events may be either informative or query type of events, including data updates or data or logic injection events. Informative events do not require response from the centralised system, that is, in certain points of procedure an event is generated and sent and then the procedure continues with the next step. Such informative events include for example postpaid billing (if the gateway is aware of that the respective party has a postpaid subscription), access logs and information about failed requests/responses. Queries require a response before the procedure may continue, that is, the procedure is halted until a response is received. Such query type of events include for example prepaid billing (also postpaid, if the gateway is not aware of that the respective party has a postpaid subscription) and capability queries. The following is an example of a data update event: A hand-set database maintains information about hand-sets of end-users. If the system notices that the end-user uses other hand-set than the one defined in the hand-set database, this information is conveyed to the event aggregator as an event whereby the event aggregator may update the hand-set database with information about the new hand-set. That is, in principle a data update event is one kind of an informative event. The events may also be data and logics feed events where the gateway (or other similar node) changes status of some network parameters through the event aggregator, or sends in logics, such as for example triggering logics, to some node behind the event aggregator.

As another example of the analysis in the event aggregator, the business logic may contain software code that analyses the inputs (the events from the network elements) and creates the outputs (the information that is sent to the network operator systems). Also, business logics may search for event patterns in the incoming event feed and based on a specific pattern found in the event feed a specific message is sent further to the network operator systems. In this case, the business logics would act as a generic pattern recognition engine. For example, the event aggregator might be set up to search for a pattern (A, B, C) in MSISDN. Then, lets assume an event feed A1, A2, C2, B1, A2, C1 (the numbers here indicating MSISDN 1 and MSISDN 2) is received in the event aggregator. This feed would include the searched pattern (A, B, C) for the MSISDN 1, but not for MSISDN 2. Based on this, a message indicating a match for MSISDN_1 is sent to the network operator systems and depending on the setup the events relating to MSISDN_2 may be for example discarded.

Figure 5:
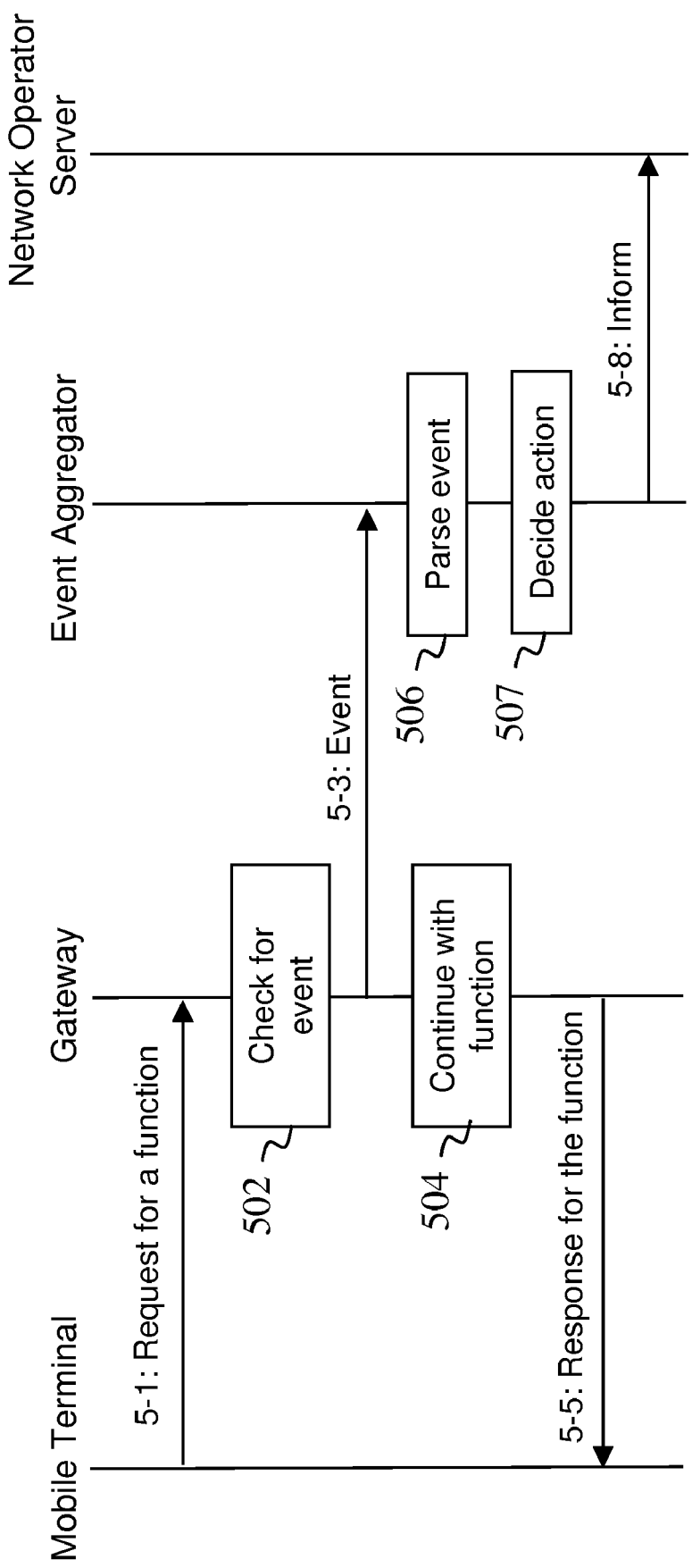
FIG. 5 shows a messaging diagram illustrating the use of an informative event according to another embodiment of the invention.

FIG. 5 shows a messaging diagram illustrating the use of an informative event according to another embodiment of the invention.

First a mobile terminal sends a request for a function 5-1 to a gateway. The function may concern for example an email or a middlet download or an HTTP request. The gateway begins to perform the function and checks in step 502 whether an event needs to be generated. In practise the check may be such that in certain points of execution of the function there are instructions to generate a certain type of an event or a hook to a script generating certain event. The check may be implemented for example by means of configuration, scripting, or user parameters. After generating an event the gateway sends the event 5-3 to an event aggregator. Then the gateway continues normally with the rest of the function in step 504 and sends a response for the function 5-5 to the mobile terminal.

The event aggregator parses the event in step 506. Then in step 507, it decides on appropriate action on the basis of the event type and other parameters and sends relevant information 5-8 to relevant network operator server (for example to a capability server or to a billing system). The information that is sent to the network operator server may comprise executable logic and/or parameters for executable logic.

For example, the event aggregator could be used for billing in content streaming use case. First, a customer sends an SMS message from a handset through a Message Router network element for retrieving a content stream. The Message Router sends an event 'SMS sent' (1) to the event aggregator. The SMS message is forwarded to a streaming server that responds by sending a Push Message (for example according to the WAP Push standard) to the handset through the Message Router. Now the streaming server sends an event 'stream requested' (2) to the event aggregator. After receiving the Push Message, the user initiates the stream, and the streaming server sends the stream to the user's handset and an event 'begin of stream' (3) to the event aggregator. After the stream ends, the streaming server sends an event 'end of stream' (4) to the event aggregator. After this, the event aggregator analyses the events 1-4 and sends to a billing system a message indicating that user NN needs to billed for example for X minutes of connection time or Y bytes of data transfer. It must be noted that this is just a general example and that the events of this example could have been all generated for example in the Message Router, if such set up was considered more appropriate.

Figure 6:
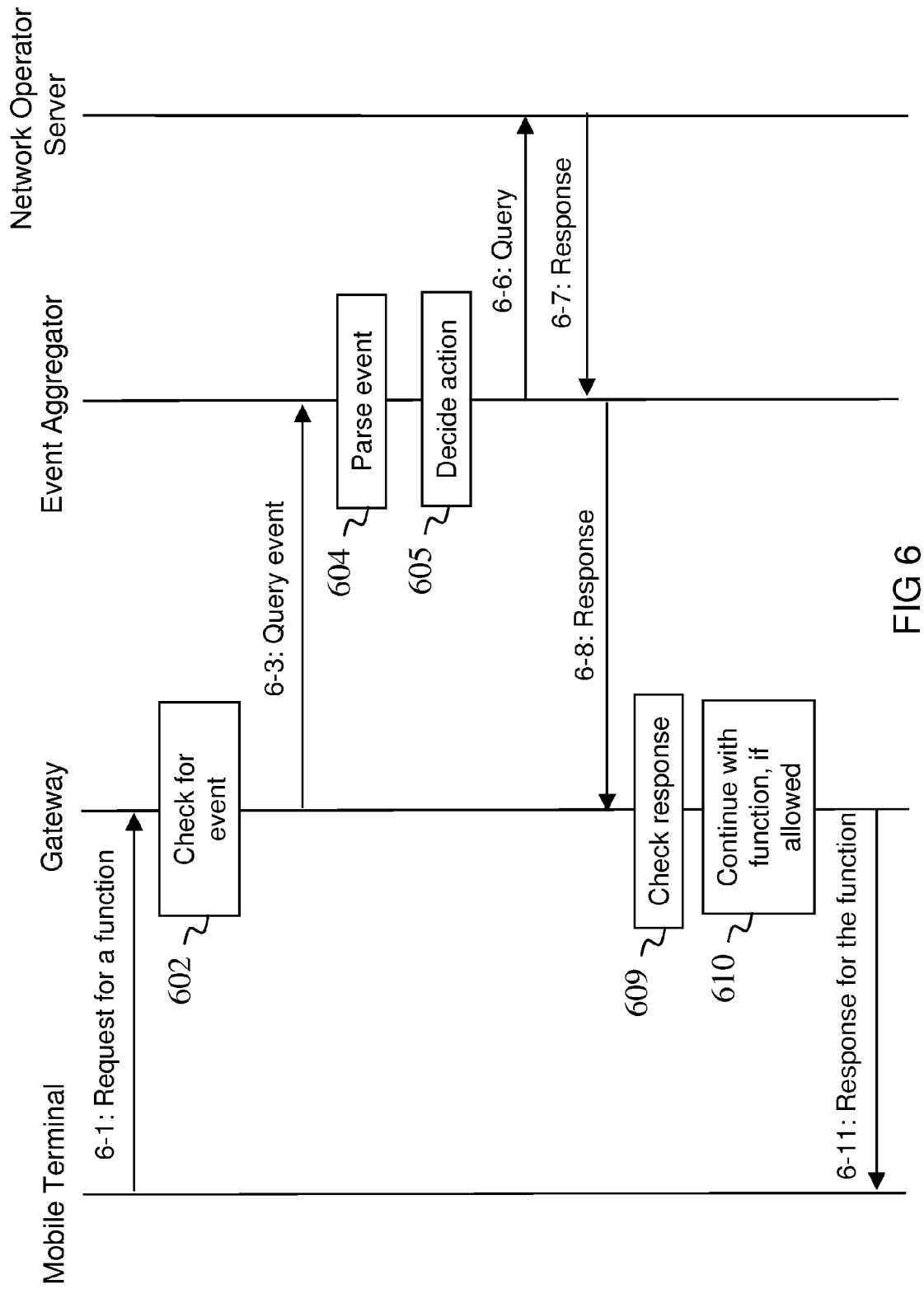
FIG. 6 shows a messaging diagram illustrating the use of a query-type event according to another embodiment of the invention.

FIG. 6 shows a messaging diagram illustrating the use of a query-type event according to another embodiment of the invention.

First a mobile terminal sends a request for a function 6-1 to a gateway. The function may concern for example an email or a middlet download or an HTTP request. The gateway begins to perform the function and checks in step 602 whether an event needs to be generated. In practise the check may be such that in certain points of execution of the function there are instructions to generate a certain type of an event or a hook to a script generating certain event. The check may be implemented for example by means of configuration, scripting, or user parameters. After generating an event the gateway sends the event 6-3 to an event aggregator and stalls execution of the function until the event aggregator provides a response. Stalling the execution may be conducted synchronously or asynchronously. (Alternatively and depending on the overall implementation the gateway may continue with execution of the function before receiving a response to the query.)

The event aggregator parses the event in step 604. Then in step 605, it decides on appropriate action on the basis of the event type and other parameters and sends relevant query 6-6 to relevant network operator server (for example to a capability server or to a billing system). The network operator server answers with relevant response 6-7 and the event aggregator relays the response 6-8 to the gateway. The event aggregator or the network operator server may also check users access rights before sending the response (6-7 or 6-8).

The gateway element parses and checks the response in step 609 and continues with the rest of the function in step 610, if it is allowed. Then the gateway sends a response for the function 6-11 to the mobile terminal. Depending on the response 6-8 from the event aggregator the gateway may also abort the function or divert the function workflow.

In an embodiment of the invention, if the event aggregator does not get the response 6-7 from the network operator server or the gateway does not get the response 6-8 from the event aggregator during certain time interval, it is assumed that the response is negative and the operation must be aborted.

In an embodiment of the invention, the query type of an event comprises a data object, which is then modified in the network operator server (for example in a content transcoding system) and returned in modified format to the network node as a response to the query.

In connection with FIGS. 5 and 6 it must be noted that depending on the implementation details, execution of one requested function may comprise several event generation points. Further, depending on the implementation, the events may be sent to the event aggregator either before or after executing some function.

Figure 7:
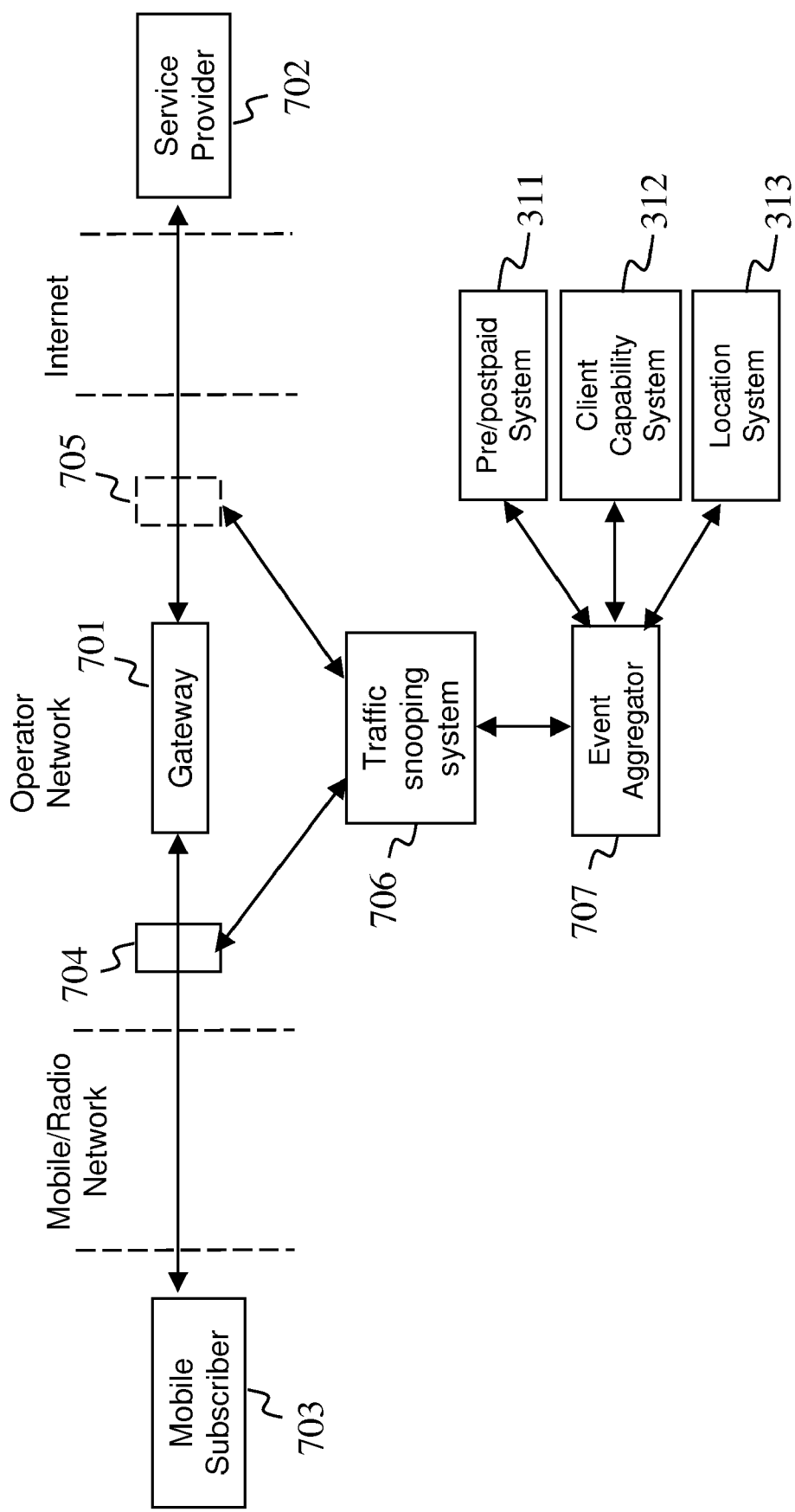
FIG. 7 illustrates a system according to another embodiment of the invention.

FIG. 7 illustrates a system according to another embodiment of the invention. Therein the events are generated by means of a traffic snooping system, that is, in this embodiment the gateways do not need to support the event aggregator model.

The system comprises a gateway element 701 in an operator network. The gateway element may be for example an MMS gateway and a WAP gateway. Service provider 702 is connected to the gateway element 701 over Internet. By means of the functionality provided by the gateway element the service provider provides services to mobile subscriber 703, which is connected to the gateway element via mobile network. Herein it must be noted that the gateway element may be a software process running in the same physical device with other gateway elements. Further, more than one service provider may be connected to the gateway element and equally more than one mobile subscriber may be connected to the gateway element.

Further, the system comprises an external traffic snooping system 706, which is adapted to collect information from network traffic. By means of the snooping means 704 located between the mobile subscriber and the gateway, the traffic snooping system 706 sees the traffic flowing in the network and can extract information from the flow. (Alternatively the snooping could be implemented by means of snooping means 705 located between the gateway and the service provider.) The traffic snooping system is adapted to listen to the traffic in the network and parse events on the basis of traffic it sees.

The traffic snooping system 706 is connected to (integrated to) an event aggregator element 707. The traffic snooping system 706 is configured so that when it sees relevant events in the traffic flow it encounters instructions to generate predefined events and to send them to the event aggregator element.

The event aggregator element 707 is connected to (integrated to) network capability systems of the network operator, that is, to a prepaid/postpaid system 311 (billing system), a client capability system 312 and a location system 313. This means that the event aggregator element has been implemented so that it is able to employ the functionalities offered by the network capability systems.

The communication between the traffic snooping system 706 and the event aggregator 707 may be synchronous or asynchronous. Any protocol, such as HTTP, SOAP, RMI, CORBA, Web Services and so forth, may be used in that communication. Furthermore, the events may be encoded in any suitable format, such as XML, plain text, binary messages, and so forth.

The difference between the system of FIG. 7 and prior art system shown in FIG. 2 is that in the system of FIG. 7 the integration to the network element systems and the extraction of information from the traffic flow are separated into two elements (traffic snooping system 706 and event aggregator element 707). This way, the event aggregator and the integration to the network operator systems can be implemented without knowledge of the element that actually provides information about the traffic flow (that is, creates the events).

With regard to the system of FIG. 3, now the gateway element is not connected to the event aggregator element, but the events are created in the external traffic snooping system, which listens to the traffic flowing through the gateway. However, the system shown in FIG. 7 may be combined with the system shown in FIG. 3 for example so that one event aggregator element receives events both from traffic snooping systems and gateways or other elements handling the traffic flow.

It must be noted that events according to the invention can be generated outside the gateways or related traffic snoopers, too. For example (dis)connections to the mobile network, change of base stations, and so forth may generate events. In an embodiment, an event is generated when a new user is activated in the network and on the basis of the generated event a capability server is controlled to fetch relevant capability information from a database.

In an embodiment of the invention the event aggregator provides a single point of access control to information and capabilities that should be available only for a limited set of end-users or service providers. Let's consider for example that location information should be provided only to a limited set of service providers. In that case a prior art system, in which each gateway node would be separately integrated to the location system, would be complicated, because the access control would be distributed into each node, and this would clearly increase the risk of unauthorised access to confidential data.

Now that the event aggregator manages the access control to each data item, the access control can be done in a controlled, centralised manner. In this case the query needs to contain an identifier of the end-user (for example MSISDN) and an identifier of the service provider (or some other identifier of the party to whom access to network operator systems should be granted). The event aggregator then contains logics that are used to determine whether the specific data or action can be given or carried out for this particular combination of an end-user and a service provider. The event aggregator may provide means to configure the access control logics through a configuration interface (an end user interface or machine to machine interface).

Figure 8:
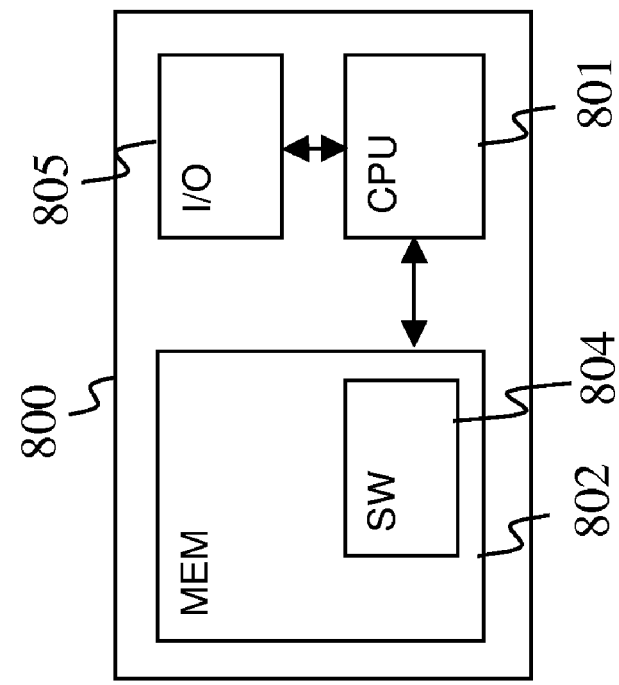
FIG. 8 shows a simplified block diagram of a network element according to an embodiment of the invention.

FIG. 8 shows a simplified block diagram of a network element according to an embodiment of the invention. Physically the network element may be for example a general-purpose computer or a server and functionally the network element is an element that sees the traffic flowing in the network, such as a gateway, a router, a firewall, a GGSN (Gateway GPRS Support Node), some other traffic relaying network element or a traffic snooping system.

The network element 800 comprises a processing unit 801 and a memory 802 coupled to the processing unit 801. The memory comprises software 804 executable in the processing unit 801. The processing unit is further connected to an input/output unit 805, via which the network element communicates with other devices.

The processing unit 801 controls, in accordance with the software 804, the network element to generate events on the basis of the traffic flow the network element sees and predefined instructions, an event being a piece of information indicating that a certain matter has occurred in the traffic flow, and to send said events for analysis in a central processing element.

The events that are sent may be informative or query type of events. The query type of events suit especially for network elements, which participate in the transmission of the traffic flow by processing the traffic flow in certain manner. In connection with the query type of events, such network element is further controlled to halt processing of the traffic flow when a query event is sent and to wait for a response to the event before continuing with the processing of the traffic flow, because the response usually has an effect on how the traffic flow is processed. The events may also be data update events discussed above.

Figure 9:
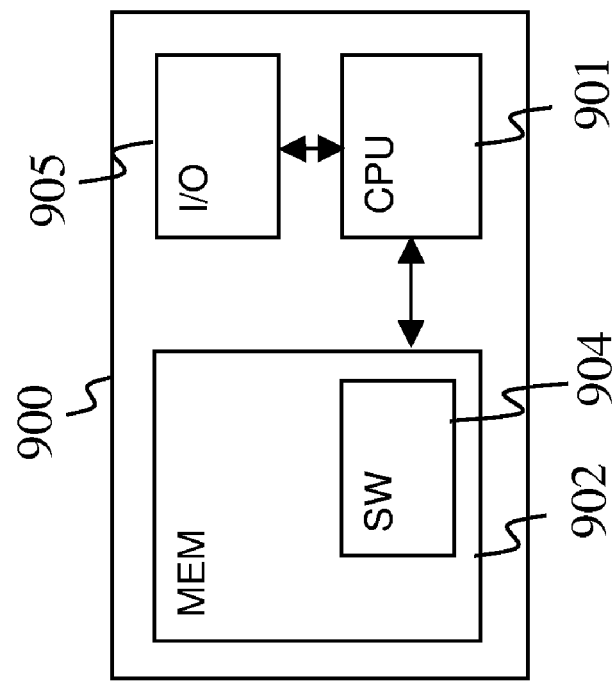
FIG. 9 shows a simplified block diagram of a central processing element according to an embodiment of the invention.

FIG. 9 shows a simplified block diagram of an event aggregator according to an embodiment of the invention. The event aggregator may be for example a general-purpose computer or a server.

The event aggregator 900 comprises a processing unit 901 and a memory 901 coupled to the processing unit 901. The memory comprises software 904 executable in the processing unit 901. The processing unit is further connected to an input/output unit 905, via which the event aggregator communicates with other devices.

The processing unit 901 controls, in accordance with the software 904, the event aggregator to analyse events received from a suitable network element or some other source, an event being a piece of information indicating that a certain matter has occurred in the traffic flow, and to convey on the basis of said analysis information to network operator systems.

The events that are analysed may be informative or query type of events. In connection with query type of events the event aggregator is further controlled to request information from the network operator systems, and to send, to the network element that sent the event, a response to the query on the basis of the response given by the network operator systems received information.

The event aggregator may be controlled to conduct the analysis of an event by looking for the received event in a predefined event tree, the event tree comprising a set of events arranged in a tree according to their properties and the events in the tree being accompanied with a corresponding action. If the received event is found in the event tree, the event aggregator is controlled to execute the action corresponding to the event in the event tree, and, if the received event is not found in the event tree, to look for and execute an action relating to a higher-level event in the event tree. Further, the event aggregator may be controlled to execute also the actions relating to all higher-level events above the received event in the event tree.

Particular implementations and embodiments of the invention have been described above. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method for gathering information from traffic flowing in communication networks, the method comprising
receiving in a central processing element events generated and sent by a network element which sees the traffic flowing in the network, at least one of said events being an information query generated on the basis of the traffic flow and predefined instructions, and an event being data indicating that a certain matter has occurred in the traffic flow,
analysing said events in said central processing element according to rules executed by the central processing element, and
conveying information to network operator systems on the basis of said analysis,
halting processing of a function in said network element, when said event comprising an information query is sent,
said step of conveying comprises sending said information query event to a network operator system and requesting information therefrom,
and
continuing with the processing of the function at the network element after a response to the information query is received at the central processing element.

2. The method according to claim 1, wherein said event information query event, comprises a data object, and
said conveying of information comprises sending the data object to the network operator systems, the method further comprising:
modifying said data object in the network operator systems,
obtaining the modified data object into the central processing element, and
sending, from the central processing element to the network element, said modified data object as a response to the query.

3. The method according claim 1, wherein said conveying of information comprises updating of information in the network operator systems.

4. The method according to claim 3, wherein said information that is conveyed to the network operator systems comprises executable logic and/or parameters for executable logic.

5. The method according to claim 1, wherein said halting and continuing are conducted synchronously or asynchronously.

6. The method according to claim 1, wherein said analysing of a received event in said central processing element comprises:
looking for said received event in a predefined event tree, the event tree comprising a set of events arranged in a tree according to their properties and the events in the tree being accompanied with a corresponding action,
executing the corresponding action, if said received event is found in the event tree, and
looking for and executing an action relating to a higher-level event, if said received event is not found in the event tree.

7. The method according to claim 6, wherein said analysing of a received event in said central processing element further comprises
executing also the actions relating to all higher-level events above said received event.

8. The method according to claim 1, further comprising conducting access control in said central processing element with regard to actions relating to the events received from the network element.

9. The method according to claim 1, wherein said network operator systems comprise a billing system, a client capability system, a location system, a hand-set database, an authentication system, a reporting system, an OSA (Open Service Architecture) Parlay system, an OSA Parlay X system, an ss7 connectivity to HLR (Home Location Register) system, a Presence server, a customer profile database, a pre-paid billing system, a post-paid billing system, a content transcoding system, and/or a digital rights management system.

10. The method according to claim 1, wherein said network element is a gateway, a router, a firewall, a GGSN (Gateway GPRS Support Node), a Service Delivery Platform or a part of a Service Delivery Platform, some other traffic relaying network element or a traffic snooping system.

11. A network element via which traffic flow of a communication network passes, wherein the network element is arranged to co-operate with a central processing element, the network element comprises:
  equipment for generating events on the basis of the traffic flow and predefined instructions, an event being data indicating that a certain matter has occurred in the traffic flow, and
  equipment for sending said events for analysis in the central processing element;
  wherein the equipment for generating are configured to generate an event comprising an information query, and the network element is configured;
  to halt processing of a function in said network element when said event comprising an information query is sent,
  send said event utilizing said equipment for sending, and
  to continue with the processing of the function after a response to the query is received at the network element.

12. The network element according to claim 11, wherein said network element is a gateway, a router, a firewall, a GGSN (Gateway GPRS Support Node), a Service Delivery Platform or a part of a Service Delivery Platform, some other traffic relaying network element or a traffic snooping system.

13. The network element according to claim 11 wherein the network element is configured to conduct said halting and continuing synchronously or asynchronously.

14. The network element according to claim 11, wherein the network element is configured to continue with the processing of traffic flow before a response to the query is received at the network element.

15. A central processing element for gathering information from traffic flowing in communication networks, wherein the central processing element is arranged to co-operate with at least one network element via which the traffic flow passes, and with network operator systems, the central processing element comprises:
  equipment for receiving events generated in a network element on the basis of the traffic flow and predefined instructions, an event being data indicating that a certain matter has occurred in the traffic flow,
  equipment for analysing said events,
  logic for executing rules according to which said analysis is configured to be done, and
  equipment for conveying information to the network operator systems on the basis of said analysis
  said equipment for analysing being configured:
  to look for said received event in a predefined event tree, the event tree comprising a set of events arranged in a tree according to their properties and the events in the tree being accompanied with a corresponding action,
  to execute the corresponding action, if said received event is found in the event tree, and
  to look for and executing an action relating to a higher-level event, if said received event is not found in the event tree.

16. The central processing element according to claim 15, wherein said event comprises an information query, and said equipment for conveying information are configured
  to request information from the network operator systems, and the central processing element is further configured
  to receive said requested information, and
  to send to the network element a response to the query on the basis of said received information.

17. The central processing element according to claim 15, wherein said event comprises an information query, which comprises a data object, and said equipment for conveying information are configured
  to send the data object to the network operator systems, and the central processing element is further configured to
  to obtain the data object in a form modified by the network operator systems, and to send to the network element said modified data object as a response to the query.

18. The central processing element according to claim 15, wherein said equipment for conveying information are configured to update information in the network operator systems.

19. The central processing element according to claim 18, wherein said information that is configured to be conveyed to the network operator systems comprises executable logic and/or parameters for executable logic.

20. The central processing element according to claim 15, wherein said equipment for analysing are further configured
  to execute also the actions relating to all higher-level events above said received event.

21. The central processing element according to claim 15, wherein the central processing element is configured to conduct access control with regard to actions relating to the events received from the network element.

22. A method for gathering information from traffic flowing in communication networks, the method comprising
  receiving in a central processing element events generated and sent by a network element which sees the traffic flowing in the network, the events being generated on the basis of the traffic flow and predefined instructions, and an event being data indicating that a certain matter has occurred in the traffic flow,
  analysing said events in said central processing element according to rules executed by the central processing element, and
  conveying information to network operator systems on the basis of said analysis,
  wherein said step of analysing comprises:
  looking for said received event in a predefined event tree, the event tree comprising a set of events arranged in a tree according to their properties and the events in the tree being accompanied with a corresponding action,
  executing the corresponding action, if said received event is found in the event tree, and
  looking for and executing an action relating to a higher-level event, if said received event is not found in the event tree.

23. The method as claimed in claim 22, wherein said step of analysing further comprises executing the actions relating to events in the tree having higher-level position within the tree then the found event.

* * * * *